United States Patent Office.

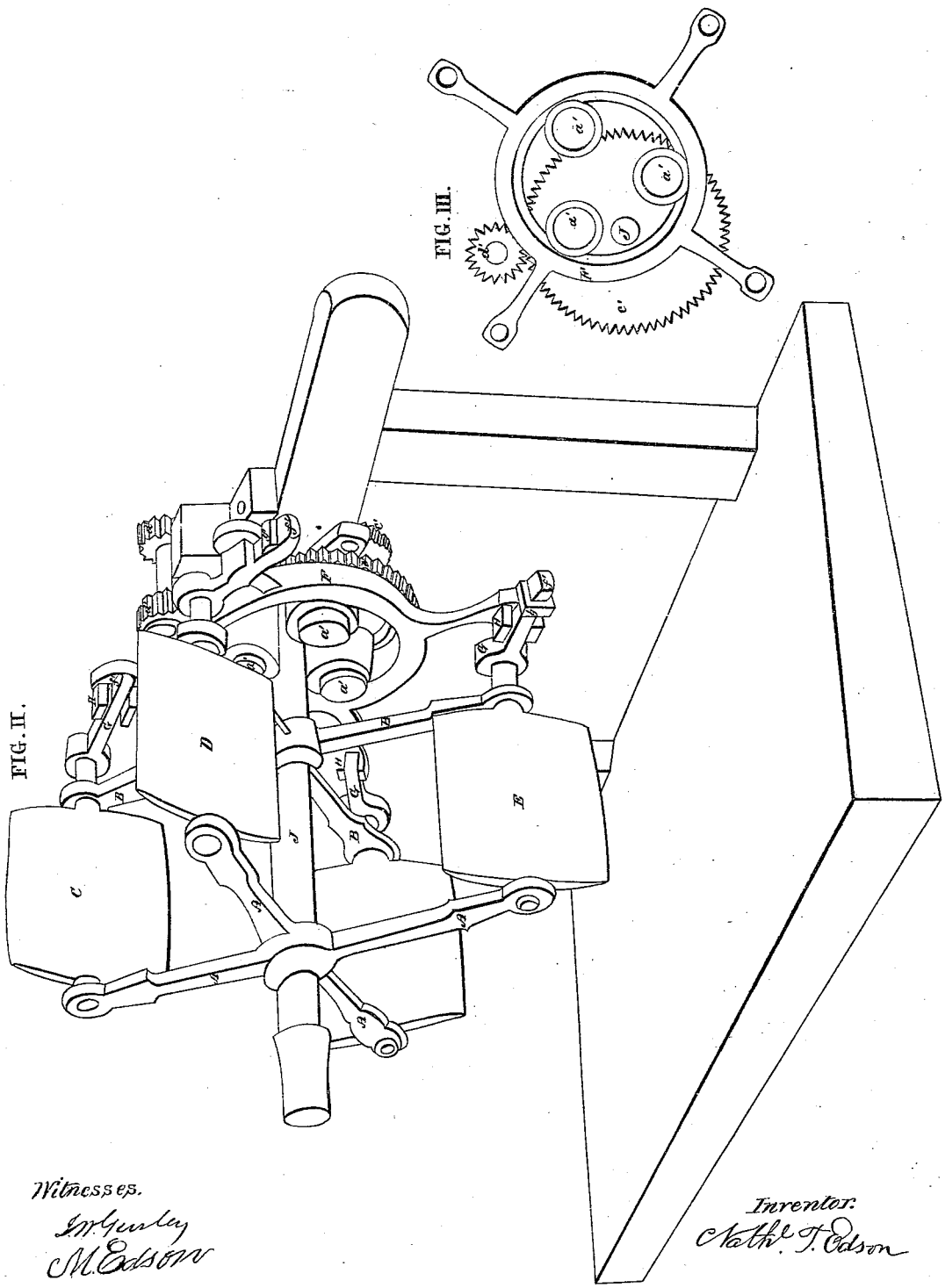

NATHANIEL T. EDSON, OF NEW ORLEANS, LOUISIANA.

Letters Patent No. 64,295, dated April 30, 1867.

---

IMPROVED PADDLE-WHEEL.

---

The Schedule referred to in these Letters Patent and making part of the same.

---

TO ALL WHOM IT MAY CONCERN:

Be it known that I, NATHANIEL T. EDSON, of New Orleans, parish of Orleans, State of Louisiana, have invented a new and improved mode of making Paddle-Wheels for propelling vessels; and I do hereby declare that the following is a full and exact description thereof, reference being had to the accompanying drawings, and to the letters of reference marked thereon.

The nature of my invention consists in so constructing the wheel and its floats or buckets that they will retain a vertical position whilst in the water.

To enable others to make and use my invention, I will describe its construction and operation.

Figure 2 is a perspective view of the wheel complete.

A and B are the wheels, to which the floats C, D, and E are pivoted. F is a wheel to hold the floats by their arms G in a vertical position. A connection is formed between the arms G and the wheel F by passing the arms through a slot or orifice formed in the swivel-blocks H, one end of the blocks being rounded, and passing through the rim of wheel F, which arrangement admits of a revolving of the wheels, and a slip of the arms in the blocks sufficient to adapt themselves to their different positions in the revolving of the wheel. Shaft I may have an outside bearing, whereby the wheel, with equal facility, can be applied to the stern of vessels. Wheel F is supported by or rests upon rollers $a'$ $a'$ $a'$, which rollers are attached to the timber on which the shaft I rests. The centre of the wheel is in the rear of the shaft I, and has firmly attached to it cog-wheel $b'$. There is attached to the shaft I, outside of its bearing, or inside of its inner bearing, a cog-wheel, $c'$, which wheel is of the same dimension, and contains the same number of cogs, as wheel $b'$. Two cog-wheels, $d'$, attached to one shaft, which shaft forms a journal for both wheels, are so placed as to mesh into wheels $b'$ and $c'$, thereby securing to the float-wheels and arm-wheel F the same movement. The arm of the float is attached to the shaft of the float on the outside of the wheel B, and at right angles with the floats. The wheel F should be as near the size of the other wheels as convenient to make it. If of less diameter than the float-wheels, it should be placed sufficiently below the shaft I to hold the float-arms horizontal when the floats are directly under the shaft I, and sufficiently aft of the shaft to bring the arms of the float-wheel and the arms of the arm-wheel F parallel. To provide against accident to the above-described arrangement of cog-wheels, the ends of the float-arms are provided with shoulders or lugs $f'$, which limit the extent of the slip of the arms in the blocks H. $g'$ are springs, which will, with the lugs, retain the float-wheels and arm-wheel in their relative positions, if a removal or accident takes place with the above cog-wheel arrangement, the object of the springs being to relieve the parts of any unnatural strain caused by the imperfection of workmanship in the constructing of the wheel or otherwise.

Figure 3 is a side elevation of wheel F and its rollers $a'$ $a'$ $a'$, shaft $g$, cog-wheel $e'$, one of the cog-wheels $d'$, the other being hid by it, as is also cog-wheel $b'$ by wheel F.

Having thus described my invention, what I claim as new therein, and desire to secure by Letters Patent, is—

1. A combination of the float-arms with their lugs $f'$, the swivel-blocks H, and wheels A B and F, when wheel F is constructed with arms firmly attached to its inner rim, and the float-arms placed at right angles with the floats.

2. I claim a combination of the cog-wheels $b'$ and $c'$, when acting and being acted upon by cog-wheels $d'$, and used with wheels A B and F, substantially as set forth and described.

N. T. EDSON.

Witnesses:
HENRY FRANTZ,
M. EDSON.